2,812,252
Patented Nov. 5, 1957

2,812,252

AIR CURING OF WATER-LAID HARDBOARD CONTAINING BUTADIENE-STYRENE COPOLYMER

John W. Baymiller, Manheim Township, Lancaster County, Pa., assignor to Armstrong Cork Company, Lancaster, Pa., a corporation of Pennsylvania No Drawing. Application March 2, 1955, Serial No. 491,763

6 Claims. (Cl. 92—3)

This invention relates to hardboard, and more particularly to a hardboard composed of bonded cellulosic fibers. Still more particularly it relates to a hardboard wherein the cellulosic fibers are bonded together with an oxidized butadiene-styrene copolymer.

Although butadiene-styrene copolymers have been used in the past to bond fibers of various kinds, such bonding usually requires the presence of an antioxidant. The nature of the butadiene-styrene copolymers is such that the copolymer undergoes oxidation in the presence of air or other oxygen-containing gas; this is particularly true at temperatures higher than room temperature. It has generally been thought that this property of oxidation has been an attendant disadvantage to the use of butadiene-styrene copolymers in various applications.

The present invention, however, utilizes this property to advantage.

According to the present invention, a hardboard is prepared by dispersing cellulosic fibers in an aqueous medium and adding to the dispersion a butadiene-styrene copolymer. The copolymer is then deposited on the fibers in the absence of antioxidants. A sheet is then formed from thus produced coated fibers. The resultant sheet is cured at an elevated temperature in the presence of oxygen.

Any cellulosic fibers may be used in making the hardboard of the present invention. Examples of such fibers are cotton, rag fiber, wood pulp, kraft pulp, and the like. The particular cellulosic fibers to be used may be selected on the basis of the strength desired in the final product. Use of kraft pulp, for example, yields a final product a great deal stronger than that resulting when rag fiber is used. Thus some degree of control over the physical properties of the final product may be obtained by selection of the fibers.

The fibers to be used are dispersed in water. It may be appropriate under certain circumstances to first pass the material supplying the fibers through a rag cutter or other means of producing more or less individual fibers. Generally speaking, it is preferred that the aqueous dispersion contain about 1% by weight fibers in accordance with the usual beater saturation techniques.

To the dispersion there may be added alum, followed by the addition of ammonium hydroxide solution in accordance with known methods of carrying out the beater saturation technique. Generally speaking, it is preferred to add about 1 part by weight of alum to every 2½ parts by weight of the butadiene-styrene latex. The ammonium hydroxide may be added in the form of a 28% solution in an amount of about 1 cc. per 1.25 parts by weight alum where the C. G. S. system is used. There may also be added at this stage, if desired, a dispersing agent, as for example a sodium alkyl aryl sulfonate.

The butadiene-styrene copolymer is added next, usually in the form of a latex of about 40% solids content. Although it is preferred that a latex which is a 50:50 copolymer of butadiene-styrene be used, this ratio is not critical. It may vary in that latexes having 30:70 to 77:23 ratios of butadiene:styrene may be used.

The amount of latex to be added will depend on the degree of hardness desired in the final product. The pick-up of rubber on the fibers may vary, as desired, between about 10% and 100%; it is preferred, however, that about 30% by weight of rubber on the fibers be utilized. Therefore, that amount of latex necessary to give the desired degree of deposition is added to the beater at this point.

According to usual beater saturation techniques, there would normally be added, along with the butadiene-styrene latex, an antioxidant in order to prevent the normally disadvantageous oxidation of the copolymer. In the present invention, however, antioxidants are carefully excluded, since this invention takes advantage of the normally detrimental oxidative properties of the copolymer.

After the rubber has been deposited on the fibers, the combination is formed into a sheet on papermaking equipment. The thickness of the sheet is not critical, but generally it is preferred that the sheet be thinner than about 0.125" in order that it may be suitable for automotive body applications. The sheet-forming step of the present invention is carried out by known methods.

Once the sheet has been formed, it is preferred that it be dried before being advanced to the curing step. However, the drying step is not essential, since its chief value comes from the fact that it eliminates or minimizes water removal during the curing step. The degree of drying to be carried out will depend on the equipment available. The sheet may be dried to bone dryness, or it may be dried simply to a water content of about 5% by weight or even more before the sheet is passed on to the curing step.

The sheet is cured at an elevated temperature in the presence of oxygen. Since there is no sulfur present, the curing of the butadiene-styrene copolymer is probably a combination of oxidation, further polymerization, and cross linking. Since the cure proceeds slowly at low temperatures of about 100°–150° F., it is generally preferred to carry the cure out at a higher temperature, as for example 230° F. A temperature of 240° F. will also produce a rapid cure, but by the time the temperature of cure has been raised to about 250° F., there is a danger that the sheet may catch fire. For this reason, the preferred range of cure is in the range of about 190°–230° F.

The rate of cure will depend, to some extent, on the amount of oxygen present during the curing step. Generally speaking, the greater the amount of oxygen, the faster the cure. Thus it can be seen that a lower temperature within the preferred range having a greater amount of oxygen present will produce about the same rate of cure as a higher temperature within the preferred range but having a lower amount of oxygen. This is to say that the rate of cure depends both on the temperature and the amount of oxygen present. It is not normally required to take special steps to insure that the requisite oxygen is present. It is usually sufficient merely to maintain an adequate supply of air around the material being cured.

On completion of the cure, the sheet may be removed, cooled, and utilized as desired. Hardboard made by the process of the present invention finds excellent use as floor underlayment and automotive body applications. The hardboard possesses excellent properties of strength and hardness, yet it is sufficiently flexible to find wide use in the above described applications. Possibly most attractive of all is the fact that hardboard of the present invention may be prepared at extremely low cost. The use of rags as a source of fibers with about 30% by weigh. butadiene-styrene copolymer on those fibers produces a strong hardboard that is unusually economically attractive.

The cure may be carried out until the board is sufficiently stiff to serve for the particular application for which it was produced. Stiffness is the best criterion of cure. Once the sheet has become sufficiently stiff, as determined, for example, by Olsen stiffness tests, the product may be cooled and used as desired. Additional curing time merely causes the hardboard to become stiffer, until the point is reached where stiffness no longer increases. This stiffness may be controlled to some extent by the amount of copolymer latex deposited on the fibers. A hardboard containing 100% by weight rubber on the fiber will achieve an ultimate stiffness greater than that of a hardboard containing 30% by weight rubber on the fibers.

The following examples illustrate embodiments of the present invention. All parts are by weight unless otherwise noted.

Example I 80 parts rag fibers are dispersed in 10 liters of water and there is added 10 parts alum and 8 cc. 28% ammonium hydroxide. Tamol M (4.8 cc. of 10% solution alkyl aryl sulfonate) is added as a dispersing agent.

To the dispersion is added 63.2 parts butadiene-styrene, 50:50, latex of 40% solids.

Once the rubber has been deposited on the fibers, the slurry is formed into a sheet on a Fourdrinier wire. The sheet was then placed on a cylinder drier at a temperature of 230° F. until the sheet was bone dry.

The dry sheet was then placed in an oven maintained at 195° F. for 5 days. At the end of this time, the sheet was removed and cooled. The product was an excellent hardboard having good strength and hardness and capable of having a fabric sewn to it.

Example II

A mixture of 40 parts of rag fiber and 40 parts kraft bleached sulfite fiber is dispersed in 10 liters of water in a beater nad alum and ammonium hydroxide added as in Example I. 16 parts butadiene-styrene latex, 50:50, is added next and deposited on the fibers; no dispersing agent is used.

The slurry was treated as in Example I and there was produced a hardboard having very desirable properties in automotive body applications.

I claim:

1. The method of making hardboard which comprises dispersing cellulosic fibers in an aqueous medium, adding butadiene-styrene copolymer to said dispersion, depositing said copolymer on said fibers in an amount ranging from about 10% to about 100% by weight of said fibers in the absence of vulcanizing agents and antioxidants, forming a sheet from thus produced coated fibers, and curing said sheet at an elevated temperature in the range of about 190°–230° F. in the presence of oxygen.

2. The method according to claim 1 wherein said copolymer comprises butadiene-styrene having a butadiene:styrene ratio of from about 30:70 to about 77:23.

3. The method according to claim 2 wherein said ratio is about 50:50.

4. The method of making hardboard which comprises dispersing cellulosic fibers in an aqueous medium, adding butadiene-styrene copolymer to said dispersion, depositing said copolymer on said fibers in an amount in the range of about 10% to about 100% by weight of said fibers in the absence of vulcanizing agents and antioxidants, forming a sheet from thus produced coated fibers, drying said sheet to a moisture content in the range of about bone dry to about 5% moisture, and curing said sheet at a temperature in the range of about 190°–230° F. in the presence of oxygen.

5. The method according to claim 4 wherein said copolymer is deposited on said fibers in an amount of about 30% by weight of said fibers.

6. A flexible hardboard comprising a water-laid sheet of cellulosic papermaking fibers, said fibers having precipitated thereon about 10%–100% by weight based on the dry weight of said fibers of a binder consisting of butadiene-styrene copolymer free of vulcanizing agents and antioxidants, said binder being in an oxidized condition as a result of air curing the sheet at a temperature in the range of about 190°–230° F.

References Cited in the file of this patent

UNITED STATES PATENTS

| | | |
|---|---|---|
| 2,474,801 | Owen | June 28, 1949 |
| 2,715,066 | Feigley | Aug. 9, 1955 |

OTHER REFERENCES

Whitby: "Synthetic Rubber," Wiley and Sons, New York, N. Y., 1954, pp. 528–538.